(12) United States Patent
Ueno et al.

(10) Patent No.: US 7,512,239 B2
(45) Date of Patent: Mar. 31, 2009

(54) PROTECTION KEY FOR HARDWARE AND INFORMATION MANAGEMENT SYSTEM

(75) Inventors: Osamu Ueno, Shizuoka-ken (JP); Yoshikazu Nishino, Shizuoka-ken (JP); Fumiaki Nishiyama, Shizuoka-ken (JP); Rei Isogai, Shizuoka-ken (JP); Yasunori Kitajima, Shizuoka-ken (JP); Miho Urano, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 896 days.

(21) Appl. No.: 10/900,357

(22) Filed: Jul. 28, 2004

(65) Prior Publication Data

US 2005/0038998 A1    Feb. 17, 2005

(30) Foreign Application Priority Data

Jul. 29, 2003    (JP)    ............................ P2003-281974

(51) Int. Cl.
  H04L 9/06     (2006.01)
  H04L 9/26     (2006.01)
  H04L 9/28     (2006.01)
  G06F 7/58     (2006.01)
  H04K 1/00     (2006.01)
  H04N 7/167    (2006.01)

(52) U.S. Cl. .................. 380/263; 726/20; 713/184; 380/228; 380/28; 705/55

(58) Field of Classification Search .................. 726/20; 713/184; 380/228, 263, 28; 705/55
See application file for complete search history.

(56) References Cited

U.S. PATENT DOCUMENTS

| | | | | |
|---|---|---|---|---|
| 3,798,360 A | * | 3/1974 | Feistel | 380/37 |
| 4,630,201 A | * | 12/1986 | White | 705/44 |
| 4,652,698 A | * | 3/1987 | Hale et al. | 713/155 |
| 5,003,597 A | * | 3/1991 | Merkle | 380/37 |
| 5,406,619 A | * | 4/1995 | Akhteruzzaman et al. | 379/93.02 |
| 6,236,981 B1 | * | 5/2001 | Hill | 705/67 |
| 6,266,413 B1 | * | 7/2001 | Shefi | 380/46 |
| 7,032,240 B1 | * | 4/2006 | Cronce et al. | 726/2 |
| 7,191,340 B2 | * | 3/2007 | Wuidart et al. | 713/189 |
| 7,272,723 B1 | * | 9/2007 | Abbott et al. | 713/185 |

(Continued)

FOREIGN PATENT DOCUMENTS

JP     2000-151580     5/2000

(Continued)

OTHER PUBLICATIONS

Shono Katsufusa, et al. Machine translation of Japanese publication 2000-151580, published May 30, 2000.*

*Primary Examiner*—Michael J Simitoski
(74) *Attorney, Agent, or Firm*—Finnegan, Henderson, Farabow, Garrett & Dunner, L.L.P.

(57) ABSTRACT

A protection key for hardware includes a first storage area configured to store a key data used for permission to use software installed in a information processor, a second storage area configured to store a data table including a plurality of random numbers, a receiver configured to receive a cryptography key from the information processor, a coder/decoder configured to encrypt the key data based on the cryptography key by picking one random number from the data table, and a transmitter configured to transmit the encrypted key data to the information processor.

6 Claims, 9 Drawing Sheets

| INPUT CODE | KEYWORD | RANK |
|---|---|---|
| 000 | 7 | 0 |
| 001 | 4 | 1 |
| 010 | 1 | 2 |
| 011 | 6 | 3 |
| 100 | 0 | 4 |
| 101 | 3 | 5 |
| 110 | 2 | 6 |
| 111 | 5 | 7 |

| RANK | PSEUDO RANDOM NUMBERS | | | | | | | |
|---|---|---|---|---|---|---|---|---|
| 0 | 57 | 02 | 56 | 19 | 55 | 29 | 41 | 00 |
| 1 | 04 | 53 | 22 | 06 | 40 | 26 | 45 | 44 |
| 2 | 61 | 16 | 48 | 43 | 42 | 52 | 07 | 62 |
| 3 | 08 | 14 | 01 | 05 | 13 | 31 | 18 | 25 |
| 4 | 39 | 30 | 59 | 36 | 32 | 37 | 09 | 47 |
| 5 | 34 | 10 | 58 | 49 | 23 | 15 | 21 | 38 |
| 6 | 20 | 50 | 51 | 33 | 11 | 28 | 12 | 46 |
| 7 | 24 | 63 | 27 | 35 | 03 | 60 | 17 | 54 |

U.S. PATENT DOCUMENTS

| | | | |
|---|---|---|---|
| 2002/0120583 A1* | 8/2002 | Keresman et al. | 705/65 |
| 2003/0091190 A1* | 5/2003 | Okutomi | 380/263 |
| 2003/0212894 A1* | 11/2003 | Buck et al. | 713/184 |
| 2004/0030935 A1* | 2/2004 | Kai | 713/202 |
| 2004/0143555 A1* | 7/2004 | Vega Crespo et al. | 705/67 |

FOREIGN PATENT DOCUMENTS

| | | |
|---|---|---|
| JP | 2001-175468 | 6/2001 |
| JP | 2002-116837 | 4/2002 |
| WO | WO 03007541 A1 * | 1/2003 |

* cited by examiner

| INPUT CODE | KEYWORD | RANK |
|---|---|---|
| 000 | 7 | 0 |
| 001 | 4 | 1 |
| 010 | 1 | 2 |
| 011 | 6 | 3 |
| 100 | 0 | 4 |
| 101 | 3 | 5 |
| 110 | 2 | 6 |
| 111 | 5 | 7 |

| RANK | PSEUDO RANDOM NUMBERS | | | | | | | |
|---|---|---|---|---|---|---|---|---|
| 0 | 57 | 02 | 56 | 19 | 55 | 29 | 41 | 00 |
| 1 | 04 | 53 | 22 | 06 | 40 | 26 | 45 | 44 |
| 2 | 61 | 16 | 48 | 43 | 42 | 52 | 07 | 62 |
| 3 | 08 | 14 | 01 | 05 | 13 | 31 | 18 | 25 |
| 4 | 39 | 30 | 59 | 36 | 32 | 37 | 09 | 47 |
| 5 | 34 | 10 | 58 | 49 | 23 | 15 | 21 | 38 |
| 6 | 20 | 50 | 51 | 33 | 11 | 28 | 12 | 46 |
| 7 | 24 | 63 | 27 | 35 | 03 | 60 | 17 | 54 |

PROTECTION KEY FOR HARDWARE AND INFORMATION MANAGEMENT SYSTEM

CROSS REFERENCE TO RELATED APPLICATIONS

This application is based upon and claims the benefit of priority from prior Japanese Patent Application P2003-281974 filed on Jul. 29, 2003; the entire contents of which are incorporated by reference herein.

BACKGROUND OF THE INVENTION

1. Field of the Invention

The present invention relates to a protection key for hardware and an information management system, especially a technology for enhancing confidentiality of data within the protection key.

2. Description of the Related Art

As related art, a protection key for hardware, called "dongle", is used to prevent illegal duplication of software. The dongle is connected to an I/O port of a computer via a connector. The computer identifies an allowed dongle, and then the computer runs the software. The dongle includes "dongle data", for example, a serial number, a product identification of the software, or a company identification provided by the company, so that the computer can determine whether to grant permission for the use of the software. When the computer grants the permission, the software matching the dongle data can be used. The computer provided with the dongle retrieves key information from the dongle, generates a cryptography key based on the key information by an encryption algorithm, and encrypts the general data based on the cryptography key so as to transmit the general data to the computer peripherals.

As shown in Japanese laid open (Kokai) No. 2000-151580, a Digital Block Cipher based on a Chaos Block Cipher Algorithm is known as a cryptography technology. Also, a well-known cryptography technology is shown in Japanese laid open (Kokai) No. 2001-175468 and No. 2002-116837.

However, the dongle data carried between the computer and the dongle is not encrypted in the related art. Therefore, the dongle data might be exposed to a risk of data leakage. Consequently, illegal copying and illegal use of the software cannot be prevented.

SUMMARY OF THE INVENTION

An aspect of the present invention inheres in a protection key for hardware including a first storage area configured to store a key data used for permission to use software installed in an information processor, a second storage area configured to store a data table including a plurality of random numbers, a receiver configured to receive a cryptography key, a coder/decoder configured to encrypt the key data based on the cryptography key by picking one random number from the data table, and a transmitter configured to transmit the encrypted key data to the information processor.

Another aspect of the present invention inheres in an information management system including a protection key for hardware, and an information processor, wherein the information processor includes a key generator configured to generate a cryptography key, and the protection key includes a first storage area configured to store a key data used for permission to use software installed in the information processor, a second storage area configured to store a data table including a plurality of random numbers, a receiver config- ured to receive the cryptography key from the information processor, a coder/decoder configured to encrypt the key data based on the cryptography key by picking one random number from the data table, and a transmitter configured to transmit the encrypted key data to the information processor.

DETAILED DESCRIPTION OF EMBODIMENTS

Figure 1:
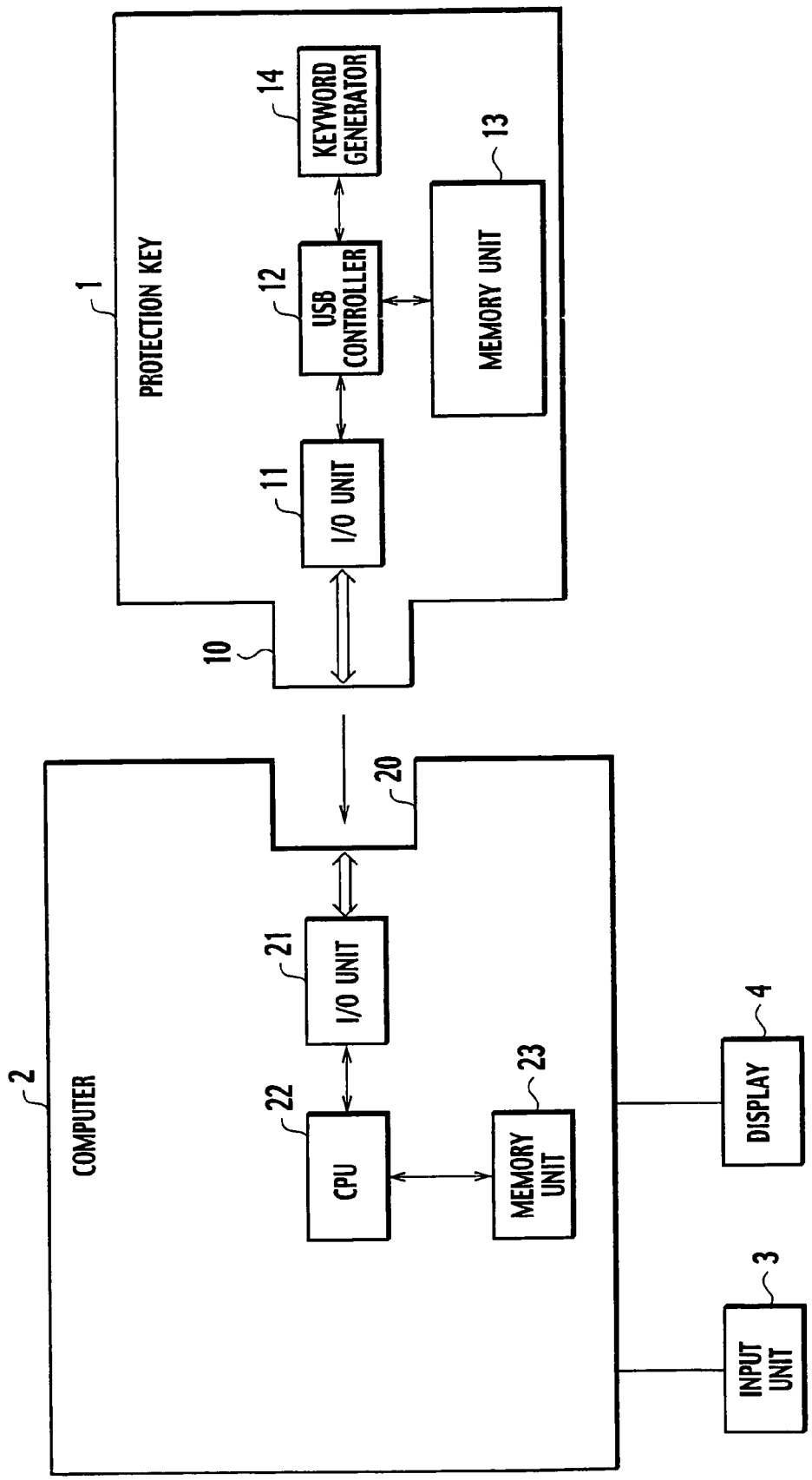
FIG. 1 is a block diagram schematically showing the information management system of the embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

As shown in FIG. 1, an information management system of an embodiment includes a computer 2 and a protection key 1 (dongle) for hardware. The protection key is configured to connect with the computer 2. The computer 2 corresponds to an information processor of the present invention. The information processor may be a handheld device such as a PDA or a mobile phone, a personal computer, a server computer, or a workstation, or the like. According to the embodiment, a USB interface is provided between the computer 2 and the protection key 1. Instead of the USB interface, a parallel interface, a serial interface, or another type of interface is available.

The protection key 1 has unique key data (dongle data) corresponding to software, and the computer 2 in witch the software is installed identifies a user of the computer 2 by the key data. The protection key is mobile. The protection key has a USB connector 10 to connect with another USB connector 20 of the computer 2. With the USB connectors, the protection key 1 and the computer 2 are connected electrically to communicate data each other.

The protection key also includes an I/O unit 11, a USB controller 12, a memory 13, and keyword generator 14. The I/O unit 11 corresponds to a transmitter and a receiver of the present invention. The I/O unit 11 has a USB interface circuit to control data transfer. That is, the I/O unit 11 receives the data transmitted from the computer 2 through the USB connector 10 and then transmits the data to the USB controller 12. Furthermore, the I/O unit 11 receives the data from the USB controller 12 and then transmits the data to the computer 2 through the USB connector 10.

Figures 2, 3:
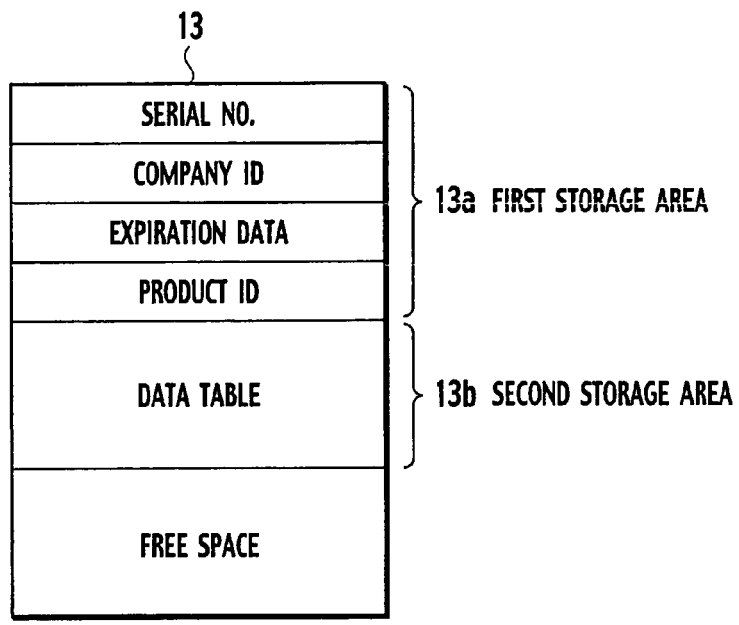
FIG. 2 is a view schematically showing the storage area of the memory unit in the protection key of the embodiment.
FIG. 3 is a view schematically showing the table for the input code and the keyword linked to the rank and the table for the pseudo random numbers linked to the rank.

The USB controller 12 has a microprocessor such as CPU and corresponds to a coder/decoder of the present invention. The USB controller encodes and decodes the dongle data. As shown in FIG. 2, a data storage area of the memory 13 is allocated for a first storage area 13a to store the dongle data, and a second storage area 13A to store a data table as data. The dongle data is equivalent to a serial number, a product identification of the software, a company identification, or restriction data, or the like. The serial number is a unique number or a unique symbol corresponding to the software. The company identification is a unique identifier provided by a company. The restriction data is data to limit the use of the software by date or frequency. The product identification is a unique identifier corresponding to the software.

The data table is a pseudo random number table based on a chaos theory. As shown in FIG. 3, the data table, for example an 8 by 8 table, includes pseudo random numbers. The pseudo numbers are generated based on a chaos time series. A logistic mapping is one of the basic models for the chaos time series. For example, a formula of the logistic mapping is shown in the following recurrence formula (1).

$$X(t+1)=4X(t)\{1-X(t)\}$$

$$X(t)=X(t+1) \quad (1)$$

Figure 4:
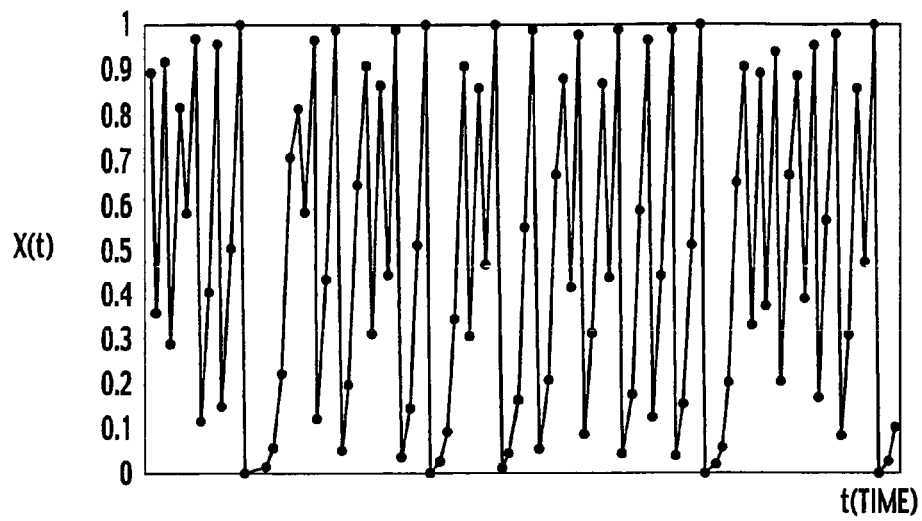
FIG. 4 is a view schematically showing the waveform of the chaos time series based on the logistic mapping.

The "t" represents discrete time and "X(t)" represents a chaos function. An initial value "X(0)" is given in the formula (1), and then the discrete time "t" increases at rate of "t, for example from 0 to 100. Finally, as shown in FIG. 4, the chaos time series of the logistic mapping, {X(t)–t} is given. In FIG. 4, the chaos function "X(t)" is plotted at a rate of a given "t. According to the formula of the logistic mapping, a value of the chaos function shows rise and fall, such as in a waveform. The waveform is susceptible to the initial value "X(0)", that is, the value of the chaos function is subject to extreme changes in accordance with even a small change of the initial value. Therefore, many varieties of sets of the pseudo random numbers are generated by changing the initial value. The formula of the logistic mapping is nonlinear because of a nonlinear I/O characteristic. The value of the chaos function "X(t)" is noninvertible because of its nonrepeatability. Therefore, the value of the chaos function cannot be easily determined, thereby enhancing confidentiality of the data.

The USB controller 12 retrieves dongle data and the data table from the memory unit 13. Also, the USB controller 12 can rewrite the dongle data and the data table. It is not necessary to separate the memory unit 13 from the USB controller 12. The memory unit 13 can be an embedded memory in the CPU including the USB controller 12.

As shown in FIG. 3, the keyword generator 14 generates a data string, for example, an eight byte data string, as a keyword. The keyword corresponds to a cryptography key of the present invention. Each of the bytes represents a number different from other numbers. For example, each of the eight bytes represents one of eight numbers of 0 to 7, respectively. The keyword generator 14 generates the keyword by randomly ordering the numbers and transmits the keyword to the USB controller 12.

The computer 2 provided with the protection key 1 activates the software only when the dongle data is recognized. The computer 2 has another I/O unit 21, a CPU 22, and another memory unit 23. The computer 2 is connected with an input unit 3 and a display 4. The input unit 3 transmits various data to the computer 2. The display 4 displays various type of information. The I/O unit 21 has a USB interface circuit and controls data transfer between the CPU 22 and the protection key 1. That is, the I/O unit 21 receives the data transmitted from the protection key 1 through the USB connector 20 and transmits the data from the CPU 22 to the protection key 1 through the USB connector 20. The CPU 22 is configured to code and decode the dongle data and activate the software. The memory unit 23 stores the same data table as the data table stored in the memory unit 13 and various type of data such as a password or the like transmitted from the input unit 3.

Figure 5:
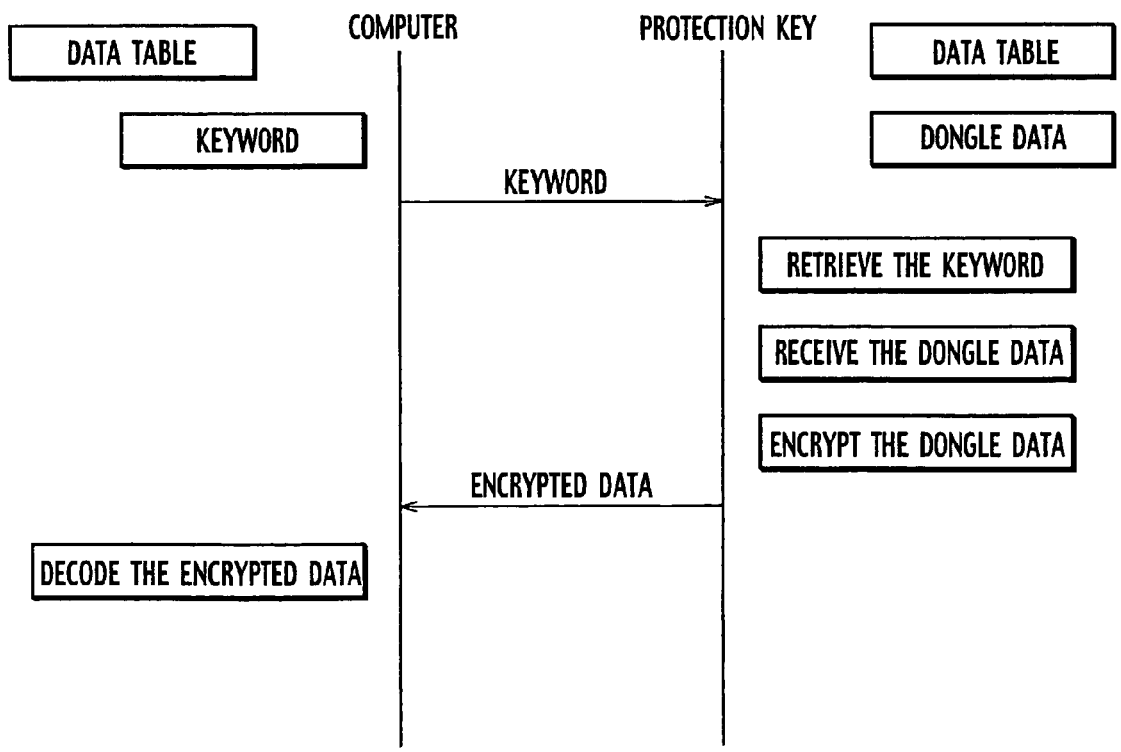
FIG. 5 is a sequence chart schematically showing the process for reading the dongle data.

An information management system of the embodiment is set forth bellow. As shown in FIG. 5, the computer 2 stores the data table in the memory unit 23. The computer 2 generates the keyword, and then transmits the keyword to the protection key 1. The keyword includes an eight byte data string in a similar way to that of the keyword generator 14 which generates the keyword. The protection key 1 receives the keyword from the computer 2 and retrieves the dongle data from the memory unit 13. Then, the protection key 1 encrypts the dongle data and transmits the encrypted key data to the computer 2. The computer 2 decodes the encrypted key data supplied from the protection key 1 and determines whether to grant permission for the use of the software having data matching the dongle data. When the computer 2 identifies the allowed dongle data, then the computer 2 permits the software to run.

Figure 6:
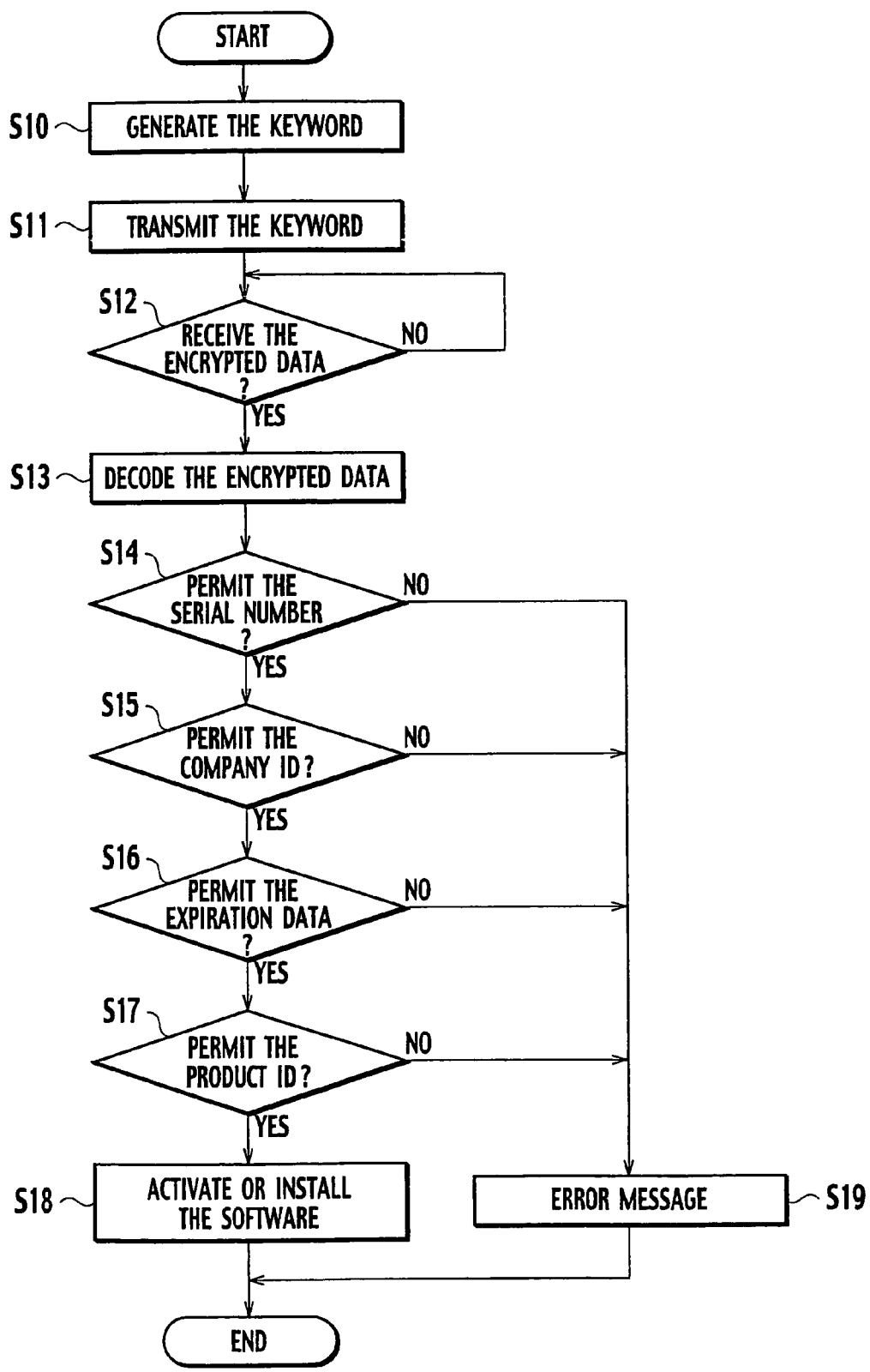
FIG. 6 is a flow chart schematically showing the process of the computer for reading the dongle data.

FIG. 6 schematically shows an operation of the computer 2. As shown in FIG. 6, the computer 2 generates the keyword in the step S10. That is, the CPU 22 in the computer 2 generates the eight byte data string similar to the data string generated by the keyword generator 14. In the step S11, the CPU 22 transmits the keyword to the protection key 1 through the I/O unit 21 and the USB connector 20. Then, the computer 2 goes into a standby mode. When the computer 2 receives the encrypted key data from the protection key 1 in the step S12, the CPU 22 decodes the encrypted key data in the step S13. The decode process goes through a procedure which is reverse to the encoded process. The dongle data such as the serial number, the company identification, the restriction data, and the product identification is decrypted.

In the step S14, the computer 2 determines whether the serial number is permitted. That is, the CPU 22 determines whether the serial number matches the data in the software. In the step S19, the computer 2 provides information to the display 4 to display an error message that prohibits the use of the software when the CPU 22 determines the serial number does not match the data in the software in the step S14. According to the embodiment, illegal use and copying of the software is prevented. In the step S15, the computer 2 determines whether the company identification is permitted when the computer 2 determines the serial number matches the software data in the step S14. That is, the CPU 22 determines whether the company identification matches the data in the software. In the step S19, the computer 2 makes the display 4 displays the error message when the CPU 22 determines the company identification does not match in the step S15. In the step S16, the computer 2 determines whether the restriction data is permitted when the computer 2 determines the company identification matches in the step S15. That is, the CPU 22 determines whether the restriction data matches the data specifying deadline and/or frequency limitation in the software. Other restriction data may be used instead of deadline and frequency limitation. In the step S19, the computer 2 provides information to the display 4 to display the error message when the CPU 22 determines the restriction data does not match the software data in the step S16. In the step S17, the computer 2 determines whether the product identification is permitted when the computer 2 determines the restriction data matches the software data in the step S16. That is, the CPU 22 determines whether the product identification matches the data in the software. In the step S19, the computer 2 provides information to the display 4 to display the error message when the CPU 22 determines the product identification does not match the software data in the step S17. In the step S18, the CPU 22 determines the dongle data of the protection key 1 is permitted when the product identification is accepted in the step S17. Then, the CPU 22 actives or installs the software.

As described above, the operation of the computer 2 to retrieve the dongle data is completed. Then, only the user having the protection key 1 can use the computer 2. At least one of dongle data such as the serial number, the company identification, the restriction data, and product identification can be sufficient in order to obtain permission for use of the computer.

Figure 7:
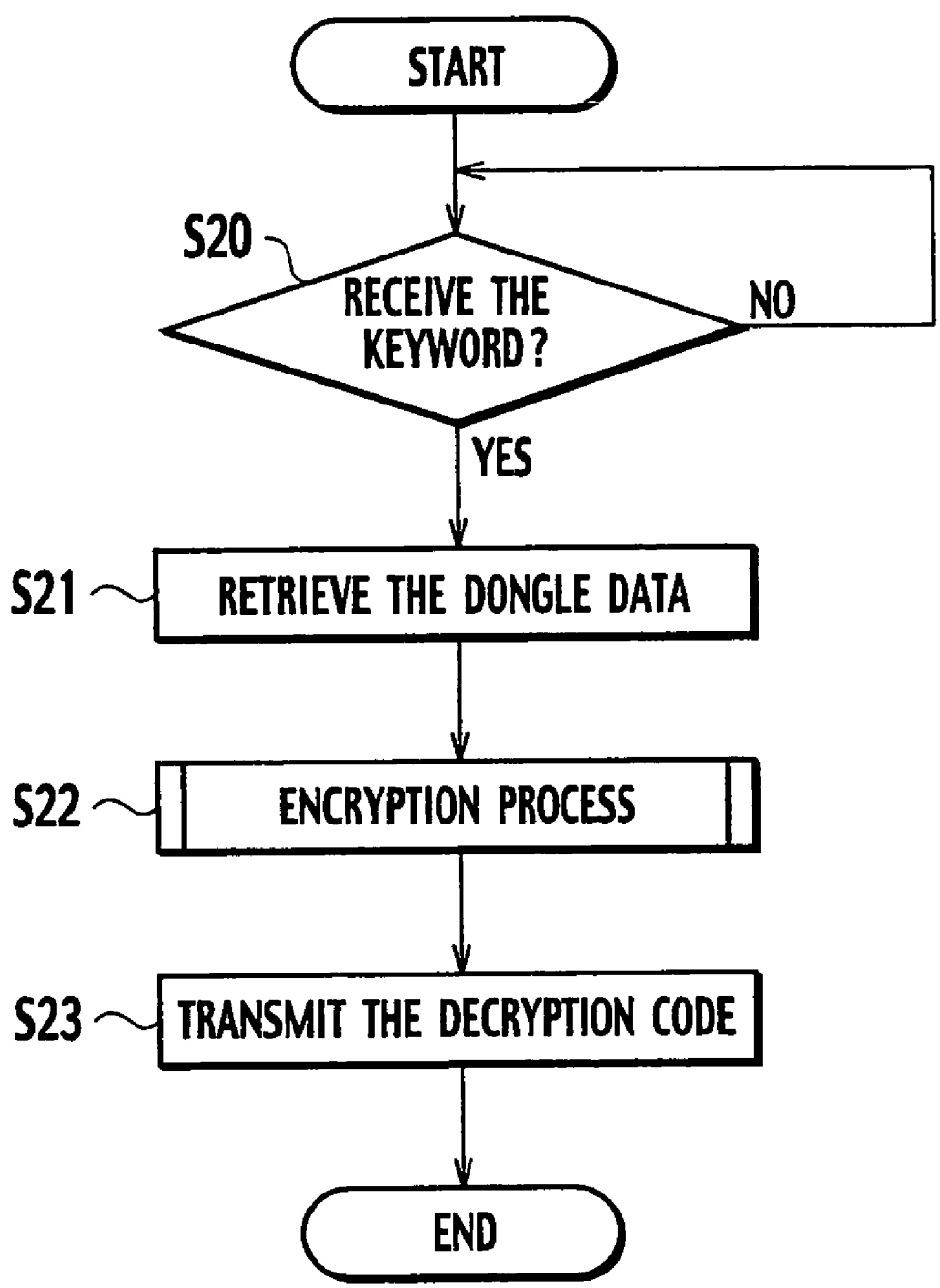
FIG. 7 is a flow chart schematically showing the process of the protection key for reading the dongle data.
Figure 8:
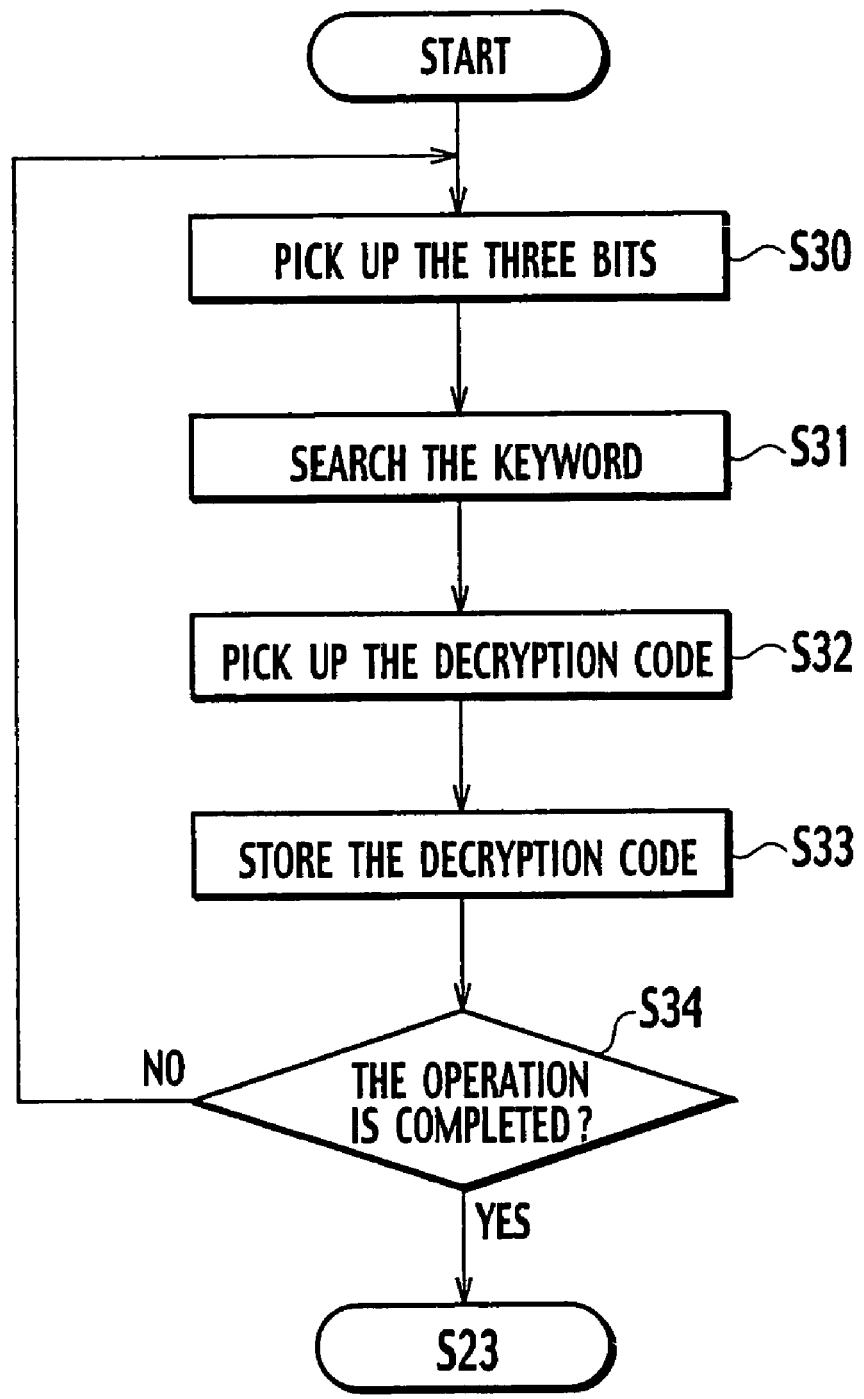
FIG. 8 is a flow chart schematically showing the encryption process.

FIG. 7 schematically shows an operation of the protection key 1. In the step S20, the protection key 1 determines whether the keyword is received. That is, the USB controller 12 determines whether the keyword is received from the computer 2 through the USB connector 10 and the I/O unit 11. In the step S21, the dongle data is retrieved. That is, the USB controller 12 retrieves the dongle data from the memory unit 13 to store the dongle data in an operation buffer not shown in FIG. 1. In the step 22, the encryption proceeds as shown in FIG. 8. As shown in FIG. 8, in the step S30, an initial three bits of the dongle data are picked as an input code. For example, the input code is shown in FIG. 3. In the step S31, the keyword and a rank of the keyword are searched based on the input code. As shown in FIG. 3, for example, when the input code is "011" in binary form, that is, "3" in decimal form, the number "3" is specified as the keyword. Then rank number "5" linked to the keyword on the table is specified as the rank. Then, in the step S32, a decryption code is picked randomly from the pseudo random numbers in a row according to the rank. For example, the pseudo random number is picked from the numbers in a row according to the rank "5". In FIG. 3, the pseudo random number is one of the numbers such as "34" "10" "58" "49" "23" "15" "21" "38". In the step S33, the decryption code is stored in a transfer buffer not shown in FIG. 1. In the step S34, it is determined whether the encryption process for all the dongle data is completed. When the operation is not completed, the operation returns to the step S30. When the operation is completed, the operation proceeds to the step S23 in FIG. 7. In the step S34, a plurality of decryption codes is stored in the transfer buffer. In the step S23 in FIG. 7, a plurality of decryption codes is transmitted from the transfer buffer to the computer 2.

Figure 9:
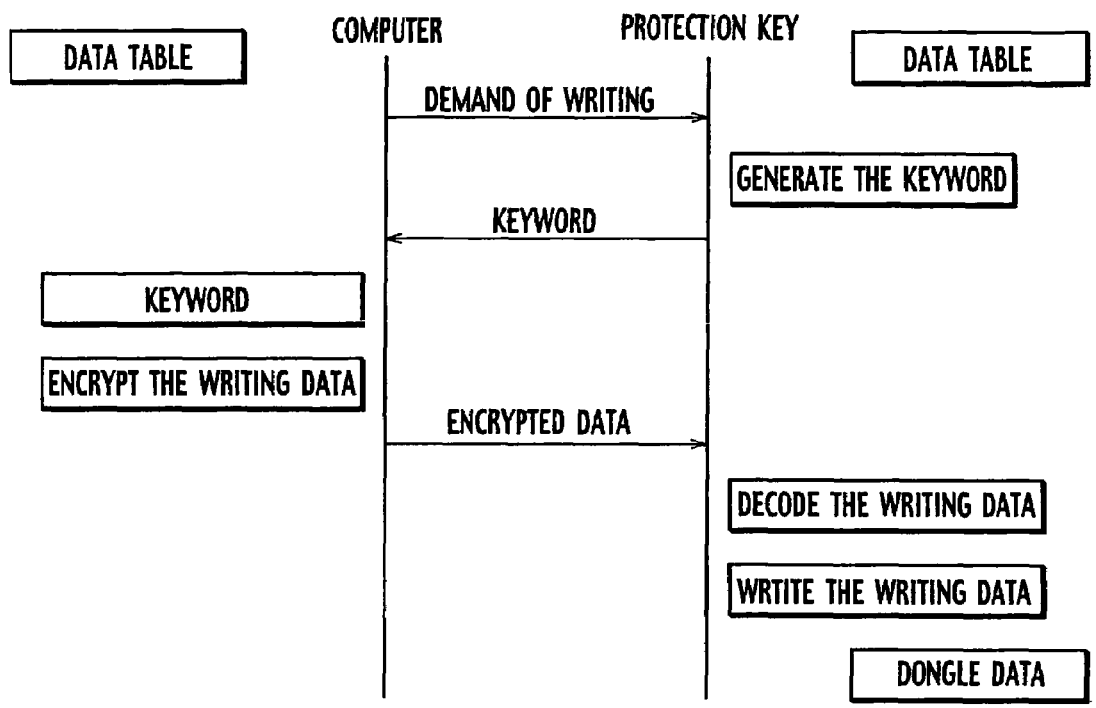
FIG. 9 is a sequence chart schematically showing the process for writing the dongle data.

FIG. 9 schematically shows an operation to write the dongle data in the protection key 1. The data of the software includes the data table that is the same as the data table stored in the memory unit 13. The computer 2 transmits data for a writing request. The protection key 1 generates the keyword on writing request and transmits the keyword to the computer 2. The computer 2 receives the keyword from the protection key 1 and retrieves a writing data from the memory unit 23. The computer 2 (encrypted data generator) encrypts the writing data and transmits the encrypted data to the protection key 1. The encryption process proceeds in the same step as the encryption process in the protection key 1, which is set forth above. The protection key 1 decodes the writing data. Then, the protection key 1 writes the writing data in the memory unit 13 as the dongle data.

Figure 10:
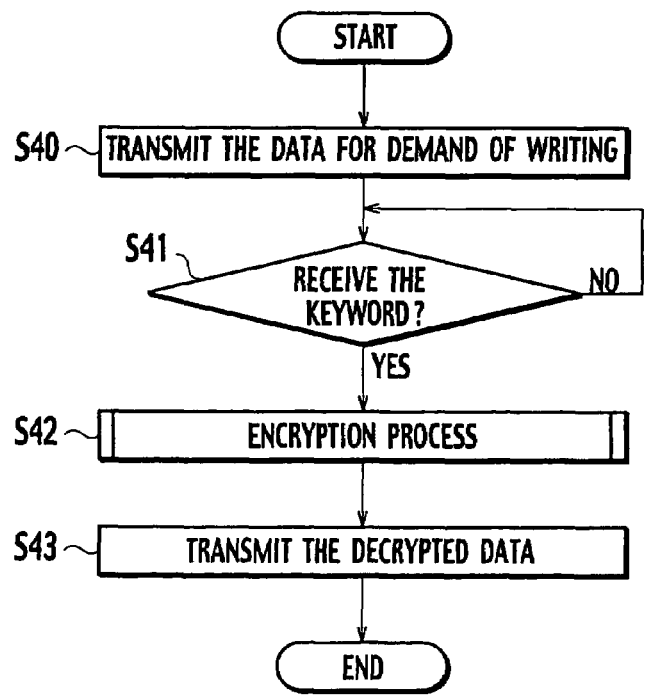
FIG. 10 is a flow chart schematically showing the process of the computer for writing the dongle data.

FIG. 10 schematically shows the writing operation of the computer 2. In the step S40, the computer 2 transmits the data for writing request to the protection key 1. That is, the CPU 22 generates a command data for writing request and transmits the command data to the protection key 1 through the I/O unit 21 and the USB connector 20. In the step S40, the computer 2 determines whether the computer 2 receives the keyword from the protection key 1. When the computer 2 receives the keyword from the protection key through the USB connector 20 and the I/O unit 21 in the step S41, in the step S42, the CPU 22 retrieves the dongle data from the memory unit 23 and encrypts the dongle data in the same step as the encryption process shown in FIG. 8. In the step S43, the encrypted data is supplied from the computer 2 to the protection key 1.

Figure 11:
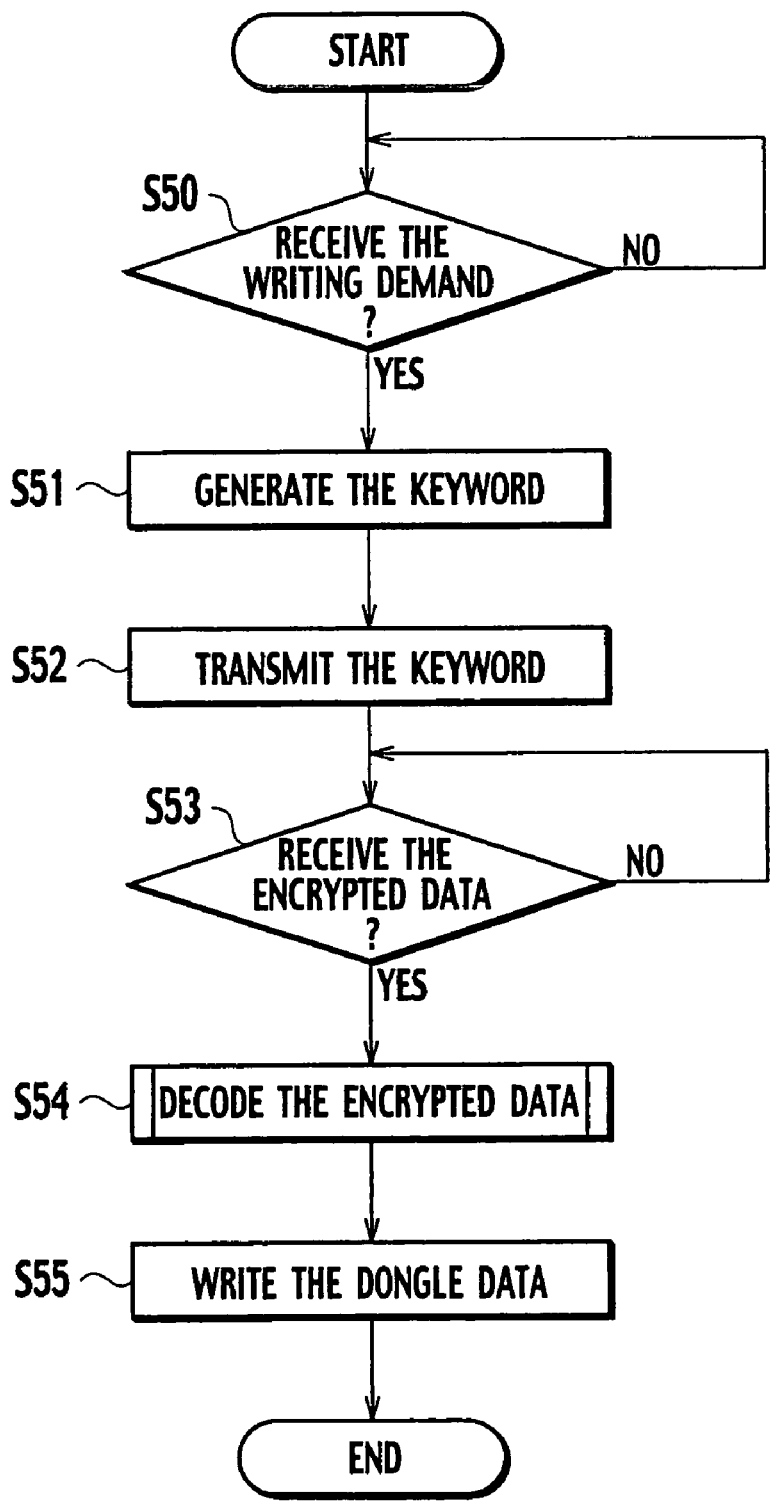
FIG. 11 is a flow chart schematically showing the process of the protection key for writing the dongle data.

FIG. 11 schematically shows the writing operation of the protection key 1. In the step S50, the protection key 1 determines whether the protection key 1 receives the writing request. That is, the USB controller 12 determines whether the writing command is supplied from the computer 2 through the USB connector 10 and the I/O unit 11. When the writing request is received in the step S50, the protection key 1 generates the keyword in the step the S51. That is, the USB controller 12 retrieves the keyword generated by the keyword generator 14 and stores the keyword in the operation buffer. In the step S52, the keyword is transmitted, that is, the USB controller 12 transmits the keyword stored in the operation buffer to the computer 2 through the I/O unit 11 and the USB connector 10. In the step S53, the protection key 1 determines whether the protection key 1 receives the keyword. When the protection key 1 receives the keyword, the protection key 1 stores the encrypted dongle data in the receive buffer and decodes the encrypted data in the step S54.

Figure 12:
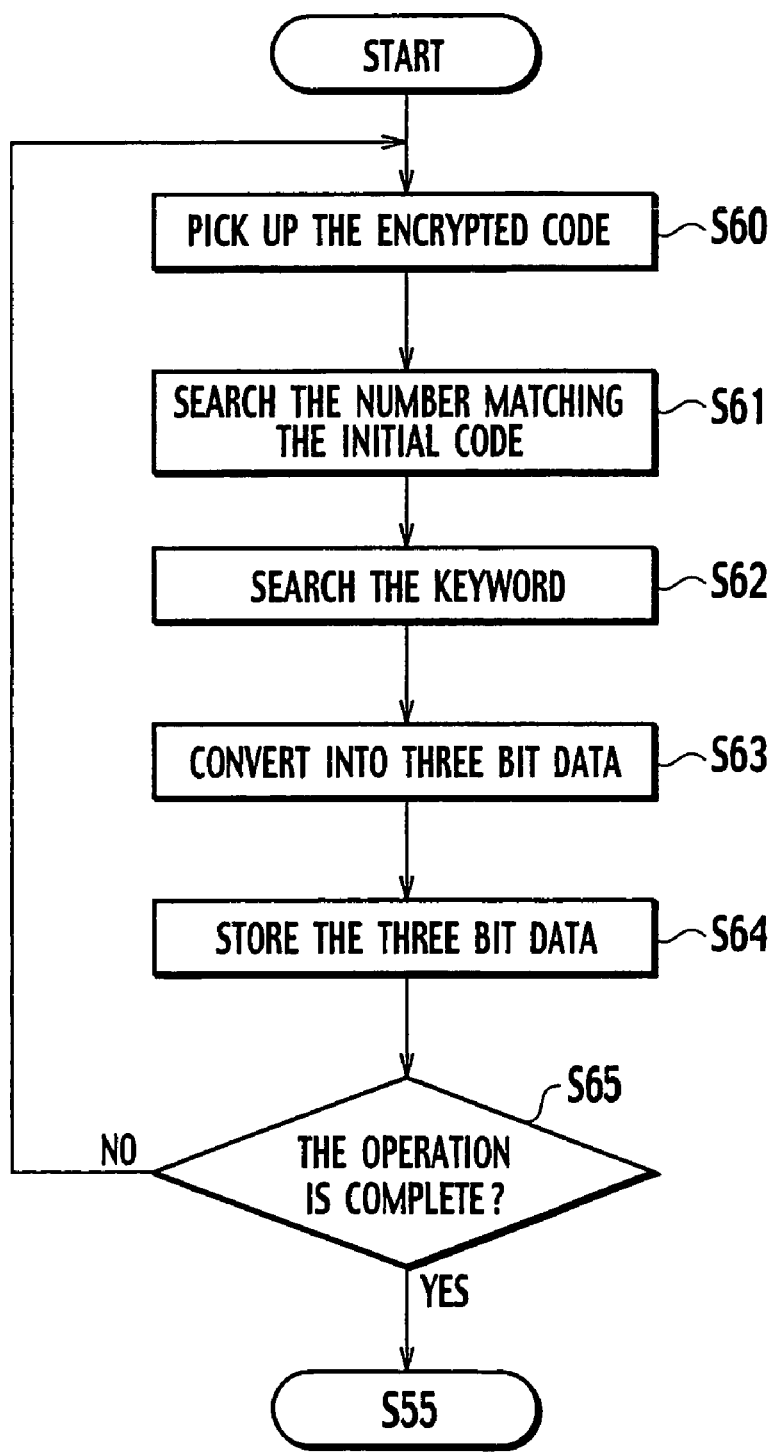
FIG. 12 is a flow chart schematically showing the decoding process.

FIG. 12 schematically shows a decoding process of the protection key 1. In the step S60, an initial code of the encrypted data is picked. In the step S61, the number matching the initial code is searched in the pseudo random number table. That is, the rank of the number matching the initial code is searched in the table. As shown in FIG. 3, for example, when the initial code is "49", the pseudo random number "49" matching the initial number is searched in a row of the rank "5" in the pseudo random number table. In the step S62, the keyword is searched. That is, the keyword number linked to the rank is searched. As shown in FIG. 3, for example, the keyword number "3" linked to the rank "5" is searched. In the step S63, the keyword number in decimal form is converted into the three bit data in binary form. As shown in FIG. 3, for example, the keyword number "3" is converted into the three bit number "011". In the step S64, the three bit data is stored in the operation buffer. As shown in FIG. 3, the three bit data "011" is stored in the operation buffer. In the step S65, it is determined whether the decoding process for all the dongle data is completed. When the operation is not completed, the operation returns to the step S60. When the operation is completed, the operation proceeds to the step S55 in FIG. 11. In the step S55, the dongle data stored in the operation buffer is written in the memory unit 13 after the decoding process. That is, the USB controller 12 writes the decoded dongle data in the first storage area 13*a* of the memory unit 13.

According to the embodiment, the protection key 1 encrypts the dongle data stored in the protection key 1 and transmits the encrypted dongle data to the computer 2. Furthermore, the protection key 1 receives the encrypted data based on the keyword from the computer 2 and decodes the encrypted data for storage in the memory unit 13 as the dongle data. Consequently, the dongle data in a data transfer process between the protection key 1 and the computer 2 is prevented from being leaked and the software is protected against illegal copying.

As shown in FIG. 3, the data table includes the pseudo random numbers generated by the Chaos theory. The encryption process and the decoding process may be based on the Chaos Block Cipher Algorithm instead of the Chaos Stream Cipher Algorithm. Consequently, it is not necessary to calculate the pseudo random numbers. Then, the speed of these processes may be increased.

The data table stored in the memory unit 13 may include any size matrix of the pseudo random numbers. For example, the data table may include 16 bytes by 16 bytes instead of 8 bytes by 8 bytes in the embodiment. In this case, the keyword includes 16 byte data indicating different numbers, 0 to 15. The input code includes 4 bit code.

In addition to transfer of the dongle data, the data table stored in the memory unit 13 may travel between the protection key 1 and the computer 2. In this case, the encryption process and the decoding process proceed based on a default data table in a random access memory (ROM) of the USB controller 12. The default data table includes pseudo random numbers generated by the Chaos theory and is encrypted and decoded by the Chaos Block Cipher Algorithm such as the data table in the memory unit 13.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A protection key for hardware comprising:
   a first storage area configured to store a key data used for permission to use software installed in an information processor;
   a second storage area configured to store a two-dimensional data table including a plurality of random numbers;
   a receiver configured to receive a cryptography key from the information processor;
   a coder/decoder configured to encrypt the key data based on the cryptography key by picking one random number from the two-dimensional data table, according to a rank, wherein the rank is determined from the cryptography key and a binary representation of the key data; and
   a transmitter configured to transmit the picked random number as the encrypted key data to the information processor.

2. The protection key for hardware of claim 1, further comprising:
   a key generator configured to generate the cryptography key, wherein
   the transmitter is configured to transmit the cryptography key to the information processor,
   the receiver is configured to receive encrypted data which is encrypted by the information processor based on the cryptography key, and
   the coder/decoder is configured to decode the encrypted data and to store the decoded data in the first storage area as the key data.

3. The protection key for hardware of claim 2, wherein the plurality of the random numbers is generated based on chaos theory.

4. An information management system comprising:
   a protection key for hardware; and
   an information processor, wherein
   the information processor includes a key generator configured to generate a cryptography key, and
   the protection key includes:
   a first storage area configured to store a key data used for permission to use software installed in the information processor;
   a second storage area configured to store a two-dimensional data table including a plurality of random numbers;
   a receiver configured to receive the cryptography key from the information processor;
   a coder/decoder configured to encrypt the key data based on the cryptography key by picking one random number from the two-dimensional data table, according to a rank, wherein the rank is determined from the cryptography key and a binary representation of the key data; and
   a transmitter configured to transmit the picked random number as the encrypted key data to the information processor.

5. The information management system of claim 4, wherein
   the information processor further comprises a encrypted data generator configured to generate encrypted data, and
   the protection key further comprises a key generator configured to generate the cryptography key, wherein
   the transmitter is configured to transmit the cryptography key to the information processor,
   the receiver is configured to receive encrypted data which is encrypted by the encrypted data generator based on the cryptography key, and
   the coder/decoder is configured to decode the encrypted data and to store the decoded data in the first storage area as the key data.

6. The information management system of claim 4, wherein the plurality of the random numbers is generated based on chaos theory.

* * * * *